United States Patent Office 3,218,245
Patented Nov. 16, 1965

3,218,245
REDUCTIVE COUPLING PROCESS FOR PYRIDINE DERIVATIVES
Manuel M. Baizer, St. Louis, Mo., assignor to Monsanto Company, a corporation of Delaware
No Drawing. Filed June 18, 1963, Ser. No. 288,629
10 Claims. (Cl. 204—73)

This invention relates to the manufacture of polyfunctional compounds and provides a new and valuable electrolytic process for reductive cross-coupling of 2- and 4-pyridyl ethylenes with other types of activated olefins. The invention also provides certain novel 2- and 4-butyl pyridines in which the butyl group bears carboxy ester or cyano substituents in the 4-position.

A general object of the present invention is the provision of a process for preparing a variety of reductively cross-coupled products of alk-1-enyl pyridines with other activated olefins. A further object is the provision of certain novel and useful classes of compounds which can conveniently be prepared by the aforesaid process.

The present process involves the electrolytic cross-coupling of compounds having ethylenic bonds in conjugated relationship to the unsaturated system of a pyridine ring with other activated olefin compounds, e.g., with alpha,beta olefinic ketones, carboxylates, carboxamides, nitriles, phosphonates, phosphinates, phosphine oxides and sulfones.

The process is illustrated:

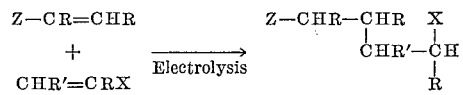

where Z is a pyridine ring radical attached at the 2- or 4-position, i.e., an even-numbered ring carbon atom, and the R's are individually selected from H or hydrocarbyl radicals, usually containing no non-benzenoid unsaturation, e.g., alkyl or aryl radicals, and R' is R or hydrocarbyloxy, e.g., alkoxy, or a carboxylate, carboxamido or cyano group, X is selected from

where R'' is a hydrocarbyl radical,

$P(O)R_2$ or $SO_2$. The pyridyl radicals can optionally be substituted by alkyl radicals, particularly lower alkyl radicals, such as methyl, ethyl, propyl, isopropyl, n-butyl, isobutyl, pentyl, hexyl, isohexyl, etc., groups, e.g., such 2- and 4-pyridyl radicals as 2-pyridyl, 4-pyridyl, 3-methyl-2-pyridyl, 3,6-dimethyl-2-pyridyl, 2-methyl-4-pyridyl, 4-hexyl-2-pyridyl, etc., and the pyridyl radicals can also contain other non-reactive substituents which do not undergo undesired transformation during the electrolysis procedure. It is necessary to have the pyridyl group bonded to the ethylene at the 2- or 4-position in order to have the ethylenic bond properly activated for the electrolysis. The position on the pyridine ring in the product will correspond to that of the reactant. The R substituents in both the pyridyl reactant and the other activated olefin can be hydrogen, alkyl or aryl, e.g., hydrogen, methyl, ethyl, propyl, isopropyl, butyl, hexyl, phenyl, alpha-naphthyl, beta-naphthyl, 2-ethylphenyl, benzyl, phenylethyl, etc. Some examples of suitable pyridyl reactants are 2-vinylpyridine, 4-vinyl pyridine, 2-crotylpyridine, 4-but-1-enylpyridine, 2-hex-1-enyl-4-methylpyridine, 2-hex-1-enyl-4-methylpyridine, 2-methyl-4-vinylpyridine, 4-methyl-2-vinylpyridine, 2(2-pyridyl)propene, 2-styrylpyridine, 1(2-pyridyl)-2-2-tolyl-ethene and various other 2- or 4-pyridyl ethylenes.

As R' in the above reaction, any of the foregoing R's are suitable or, e.g., ethoxy, carbethoxy, cyano, etc., groups. Suitable activated olefins are, for example, acrylonitrile, ethyl acrylate, ethyl crotonate, ethyl beta-ethoxyacrylate, acrylamide, diethyl fumarate, diethyl vinylphosphonate, methyl vinyl sulfone, etc. Other examples of suitable activated olefins for use herein can be found in my copending applications S.N. 145,480 and 145,482, filed October 6, 1961, and now abandoned in favor of applications S.N. 333,647, filed December 26, 1963; S.N. 337,540, filed January 14, 1964; and S.N. 337,-546, filed January 14, 1964; and in S.N. 255,221, filed January 31, 1963, in general any compounds suitable for electrolytic hydrodimerization being suitable for cross-coupling with 2- or 4-alk-1-enyl pyridines according to the present invention. The conditions taught in the referred-to applications are suitable for reductive coupling except for such changes as may be indicated for the purpose of directing the process to production of cross-coupled products. In general the vinyl pyridines have a tendency to be acceptors in the coupling so that the coupling partner used should preferably reduce at the same or at a more positive cathode voltage.

Certain of the compounds produced according to the present invention are novel compounds characterized by the formula:

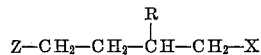

in which Z is a pyridyl radical bonded at the 2- or 4-position, R is hydrogen or a carbalkoxy group, and X is a carbalkoxy group or a cyano group. The subject compounds can be named as 1,4-substituted butanes, and the compounds can also be designated as including alkyl 5(pyridyl)valerates, alkyl 2-carbalkoxy-5(pyridyl)valerates and 5(pyridyl)valeronitriles, in which the pyridyl groups are 2- or 4-pyridyl groups. It is preferred that alkyl groups, including those in carboalkoxy groups, be lower alkyl, e.g., containing no more than 6 carbon atoms. The compounds can readily be converted to pyridine acid addition compounds, i.e., salts, by addition of acid such as hydrochloric, or quaternized by known quaternizing agents, e.g., lower alkyl halides, sulfates, p-toluenesulfonates, to pyridinium salts having germicidal properties, and can also be hydrogenated to the corresponding piperidinium salts which have structures common in compounds of curariform activity.

*Example 1*

A catholyte was prepared by mixing 50 grams tetraethylammonium p-toluenesulfonate, 125 ml. acrylonitrile (containing a trace of p-nitrosodimethylaniline) and 5 grams of water, and 16.9 ml. of redistilled 2-vinylpyridine (containing a trace of hydroquinone) was provided in a buret for addition to the catholyte. The anolyte in an Alundum cup was 12 grams of tetraethylammonium p-toluenesulfonate in 8 grams water. Mercury, 110 ml., was employed as cathode. Electrolysis was conducted at 1.5 amperes current, −1.6 to 1.65 cathode volts (vs. saturated calomel electrode) for over six hours during which time the 2-vinyl pyridine was gradually added. Acetic acid was added in small amounts during the electrolysis to control alkalinity. The total ampere-hours was 9.67. The electrolyte was diluted with water and some polymer removed by filtration. The filtrate was extracted with methylene chloride and the extracts washed with water, dried over calcium sulfate, and fractionated by distillation. Fractions taken at 118–132° at 0.6 mm. and 136–140° C., at 0.5 mm. exhibited cyano and pyridine structures by infra red, indicating the cross-coupled product, 5(2-pyridyl)valeronitrile, and elemental analysis indicated this product in impure form.

Example 2

An electrolysis was conducted employing as catholyte a solution of 52.5 grams 2-vinylpyridine, 8.6 grams diethyl fumarate, 50 grams tetraethylammonium p-toluenesulfonate, 6 grams water and 33 grams dimethylformamide. The anolyte was 16 ml. of 43% methyltriethylammonium methylsulfate in water. The electrolysis was conducted at −1.3 to 1.35 cathode volts (vs. saturated calomel electrode) for about three hours, for a total of 1.88 amperehours. About 1.75 ml. acetic acid was added during the electrolysis to control alkalinity. The catholyte was diluted with water, extracted with methylene dichloride, and the extracts washed with water and dried over calcium sulfate. The material was fractionated by distillation to obtain the cross-coupled product at 141–143° C., at 0.25 mm. The infra-red analysis supported the diethyl beta-(2-pyridyl) ethyl succinate structure, although elemental analyses indicated presence of some impurities. The pyridyl succinate product can be hydrogenated, e.g., over Raney nickel at 100 atmospheres and 125 to 150° C., to obtain reduction along with ring closure to form the corresponding 4-ketoquinolizidine:

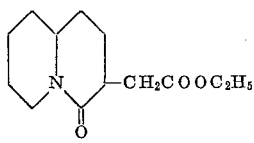

Quinolizidine compounds are known to have curariform activity. From the described beta-(2-pyridyl)succinate it is possible to prepare such compounds having a carbalkoxy group separated from the nucleus by a methyl group.

Example 3

A catholyte was prepared from 24.4 grams 4-vinyl pyridine, 50 grams methyl vinyl ketone, 70 grams tetraethylammonium p-toluenesulfonate, 6 grams water and 100 ml. acetonitrile, and a trace of p-nitrosodimethylaniline was added as inhibitor. The anolyte was 20 ml. of 82% by weight methyltetrabutylammonium methylsulfate diluted with 20 ml. water. Electrolysis was conducted at −1 to −1.38 cathode volts (vs. saturated calomel electrode) as deposition of solids on the cathode began to cause a decline in conductivity. Solids were removed from the surface of the catholyte and dimethylformamide was added. Electrolysis was continued, mainly at −1.25 to −1.4 cathode volts. The total ampere-hours was 9.29. The catholyte was diluted with water, extracted with methylene dichloride and the extracts dried over calcium sulfate. Solvent and unreacted methyl vinyl ketone was stripped off and the residue distilled through a column and redistilled with microapparatus, fractions being separated at 96–102° C., at 0.05 mm., and 102° C., at 0.05 mm. Infra red spectra indicated presence of the ketone and 4-substituted pyridine ring of 6-(4-pyridyl)-2-hexanone. The samples were combined and subjected to vapor phase chromatography, and the major fraction collected and analyzed: Calc'd: C, 74.55; H, 8.52; N, 7.91; mol. wt.; 177.2. Found: C, 73.72; H, 8.52; N, 7.15. The compound has previously been reported, Bull. Soc. Chim. France, 322 (1961).

The above examples are illustrative of the present process and the cross-couplings of the activated olefinic compounds set forth herein can be conducted under the same conditions or numerous variations thereof. In addition the procedures and principles of my copending application S.N. 163,028 can be employed herein.

While high concentrations of the reactants are readily obtained with some salts, concentrations can be increased by using a polar solvent along with the water, e.g., acetonitrile, dioxane, ethylene glycol, dimethylformamide, dimethylacetamide, ethanol or isopropanol in addition to the salts.

It will be recognized that the term "coupling" as employed herein refers to the joining together of two different compounds.

Electrolysis, of course, has been practiced for many years and numerous materials suitable as electrolytes are known, making it within the skill of those in the art in the light of the present disclosure to select electrolytes for reductive coupling according to the present invention. In general, any electrolytes suitable for hydrodimerization of the individual olefinic compounds are suitable for employment in reductive coupling reactions of such compounds. As discussed in my aforesaid copending applications, some olefinic compounds are subject to polymerization or other side reactions if the electrolyte is acidic, or excessively alkaline, and it will be necessary in such cases to conduct the reductive coupling in non-acidic solution, and in some cases below a pH at which undesirable side reactions occur, e.g., below about 9.5.

In effecting the reductive coupling of the present invention it is preferred to utilize a cathode having an overvoltage greater than that of copper and to subject to electrolysis in contact with such cathode a concentrated solution of a mixture of the defined olefinic compounds in an aqueous electrolyte under mildly alkaline conditions. In effecting the reductive couplings of the present invention, it is essential to obtain cathode potential required for such couplings and therefore the salt employed should not contain cations which are discharged at substantially lower, i.e., less negative, cathode potentials. It is desirable that the salt employed have a high degree of water solubility to permit use of very concentrated solutions for concentrated salt solutions dissolve greater amounts of the organic olefinic compounds.

In addition to the foregoing considerations, a number of other factors are important in selecting salts suitable for good results. For example, it is undesirable that the salt cation form an insoluble hydroxide at the operating pH, or that it discharge on the cathode forming an alloy which substantially changes the hydrogen overvoltage and leads to poorer current efficiencies. The salt anion should not be lost by discharge at the anode with possible formation of by-products. If a cell containing a separating membrane is used, it is desirable to avoid types of anions which, in contact with hydrogen ions present in the anolyte chamber, would form insoluble acids and clog the pores of the membrane.

In general amine and quaternary ammonium salts are suitable for use in the present process. Certain salts of alkali and alkaline earth metals can also be employed to some extent, although they are more subject to interfering discharge at the cathode and the alkaline earth metal salts in general tend to have poor water solubility, making their use inadvisable. It will be realized that the coupled products will be accompanied by varying amounts of hydrodimerization products, depending upon the particular olefin pairs involved and the conditions of the electrolysis. The production of hydrodimerization products is not necessarily detrimental, as many of them are useful. However, it will often be desired to direct the process toward preferential production of the coupled product. This can be done by regulating the cell voltage so that the electrolysis occurs at a cathode potential close to that for reduction of the monomer requiring the lowest voltage, i.e., the least negative voltage. This is particularly effective if the voltage for the more readily reducible monomer is appreciably lower than that for the other monomer, for example, 0.3 volt or more below that for the other monomer. In such cases, if the electrolysis is conducted at a cathode potential just sufficiently higher than that required for the more easily reducible monomer to achieve a practical reaction rate, there is very little if any hydrodimerization of the more difficultly reducible monomer, and the products are those resulting from coupling of the two monomers, or hydrodimerization of the more easily reducible monomer. It is possible to minimize the hydrodimerization of the more easily reducible monomer by "swamping" the mixture with the other monomer, employing only enough of the easily reducible monomer to keep the cathode potential at a value near that for reduction of the easily reducible monomer. It may be desirable to utilize small amounts of the easily reducible monomer and continuously or incrementally add such monomer as it is used up.

The following table includes various olefins which can be electrolytically coupled with 2- or 4-alk-1-enyl pyridines, although it will be desirable for good yields to select those differing considerably in required cathode potential from the selected pyridine compound. 2- and 4-vinylpyridines, e.g., which can be coupled with the listed compounds, require cathode potentials circa $-1.4$ to $-1.5$ cathode volts (vs. saturated calomel electrode).

| Monomer: | $-E$ vs. saturated calomel electrode |
|---|---|
| $CH_2=\overset{\underset{\mid}{CH_3}}{C}-CN$ | 1.81 to 1.91 |
| $CH_3CH=CHCN$ | 2.08 to 2.11 |
| $(CH_3)_2C=CHCN$ | 2.01 to 2.05 |
| $(CH_3)_2C=\overset{\underset{\mid}{CH_3}}{C}-CN$ | ca. 2.15 |
| $C_6H_5CH=CHCN$ | 1.42 to 1.60 |
| $NC\overset{\underset{\mid}{CHCN}}{\underset{\parallel}{C}}H$ | 1.00 to 1.03 |
| $CH_2=CH-CH=CHCN$ | 1.42 to 1.50 |
| 1-cyano-cyclohex-1-ene | 2.15 to 2.20 |
| 1-cyano-cyclopent-1-ene | 2.13 |
| $CH_2=CHCOOEt$ | 1.85 |
| $Me_2C=CHCOOEt$ | 2.10 to 2.18 |
| $C_6H_5CH=CHCOOEt$ | 1.57 to 1.61 |
| $C_2H_5OCH=CHCOOEt$ | 2.22 |
| $\overset{\underset{\mid}{CHCOOEt}}{\underset{\parallel}{C}H}COOEt$ | 1.32 to 1.40 |
| $\overset{\underset{\mid}{CHCOOC_8H_{17}}}{\underset{\parallel}{C}H}COOC_8H_{17}$ | 1.41 |
| $\overset{\underset{\mid}{CHCOOC_4H_9}}{\underset{\parallel}{C}H}COOC_4H_9$ | 1.30 |
| $C_{18}H_{17}OOC\overset{\underset{\mid}{CHCOOC_8H_{17}}}{\underset{\parallel}{C}}H$ | 1.22 |
| $C_6H_5CH=C(COOEt)_2$ | 1.38 to 1.47 |
| $CH_3CH=C(COOEt)_2$ | 1.41 to 1.68 |
| $CH_3CH=CH-CH=CHCOOEt$ | 1.50 to 1.59 |
| $CH_2=CHCONEt_2$ | 1.91 to 1.95 |
| $CH_3CH=CHCONEt_2$ | 2.03 to 2.12 |
| $CH_2CHCONH_2$ | 1.82 to 2.00 |
| $C_6H_5CH=CHCONEt_2$ | 1.67 to 1.73 |
| $C_6H_5CH=CHCOCH_3$ | 1.29 |
| $(CH_3)_2C=CHCOCH_3$ | 1.58 to 1.73 |

For the electrolysis of the present invention, the activated olefins are dissolved in a solution to be employed as catholyte. In general, the electrolytic reductive coupling is conducted in concentrated solution in an aqueous electrolyte. It is desirable to employ fairly concentrated solutions in order to minimize undesired reactions of intermediate ions with the water of the electrolyte. The olefinic reactants will comprise at least 10% by weight of the electrolyte, and preferably at least 20% by weight or more. It is generally desirable to employ fairly high concentrations of salts in the electrolyte, for example constituting 30% or more by weight of the total amount of salt and water in the electrolyte, in order to obtain the desired solubility of the olefinic compounds.

An electrolytic cell having a cathode of high hydrogen overvoltage is charged with the thus prepared solution and an electric current is passed through the cell to effect the reductive coupling reaction. Depending upon the concentration of the olefinic compound and upon the hydrogen ion concentration of the solution there may or may not be formed products other than the coupled products and saturated dimers. Thus, when working with concentrations of olefinic compound which are less than 10% or from 10 to 20% by weight of the solution, there may be formed compounds such as the reduced monomers or other condensation products. With acrylonitrile as a reactant, for example, propionitrile and/or bis(2-cyanoethyl) ether may thus be obtained as by-products. The solution should have a pH of 7 or above, i.e., the solution should be basic.

During electrolysis in a divided cell, alkalinity increases in the catholyte. However, the anolyte becomes acidic. When a porous diaphragm is used to separate the catholyte from the anolyte, the alkalinity of the catholyte will depend upon the rate of diffusion of acid from the anolyte through the porous barrier. Control of alkalinity in the catholyte, when employing a diaphragm, may thus be realized by purposely leaking acid from the anolyte into the catholyte. It can also be achieved, of course, by extraneous addition to the catholyte of an acid material, e.g., glacial acetic acid, phosphoric acid or p-toluenesulfonic acid. Alkalinity may also be controlled, whether or not a diaphragm is used in the cell, by employing buffer systems of cations which will maintain the pH range while not reacting at the reaction conditions.

When the olefinic compounds include a carboxylate, the pH of the solution should not be allowed to rise to the point where substantial hydrolysis of the ester occurs. Since the lower alkyl esters, i.e., the methyl or ethyl esters, are usually more readily hydrolyzed than the higher alkyl esters, the optimum pH will vary with the nature of the ester. When the olefinic compounds include acrylonitrile, it will be desirable to maintain the pH at substantially below 9.5 in order to avoid or substantially minimize cyanoethylation. Otherwise, substantial quantities of bis(beta-cyanoethyl) ether are obtained. Similarly, when other olefinic nitriles are employed, it will be necessary to maintain the pH low enough to substantially minimize addition of water to the double bond.

Among the salts which can be employed according to the invention for obtaining the desired concentration of dissolved olefinic compound, the amine and quaternary ammonium salts are generally suitable, especially those of sulfonic and alkyl sulfuric acids. Such salts can be the saturated aliphatic amine salts or heterocyclic amine salts, e.g., the mono-, di- or trialkylamine salts, or the mono-, di- or trialkanolamine salts, or the piperidine, pyrrolidine or morpholine salts, e.g., the ethylamine, dimethylamine or triisopropylamine salts of various acids, especially various sulfonic acids. Especially preferred are aliphatic and heterocyclic quaternary ammonium salts, i.e., the tetraalkylammonium or the tetraalkanolammonium salts or mixed alkyl alkanolammonium salts such as the alkyltrialkanolammonium, the dialkyldialkanolammonium, the alkanotrialkylammonium or the N-heterocyclic N-alkylammonium salts of sulfonic or other suitable acids. Further specific examples of suitable amine and ammonium cations will be given below in setting forth specific salts suitable for use in the present invention. The saturated aliphatic or heterocyclic quaternary ammonium cations in general have suitably high cathode discharge potentials for use in the present invention and readily form salts having suitably high water solubility with anions suitable for use in the electrolytes employed in the present invention. The saturated, aliphatic or heterocyclic quaternary ammonium salts are therefore in general well adapted to dissolving high amounts of olefinic compounds in their aqueous solutions and to effecting reductive couplings of such olefinic compounds. It is understood, of course, that it is undesirable that the ammonium groups contain any reactive groups which might interfere to some extent with the reductive coupling reaction. In this connection it should be noted that aromatic unsaturation as such does not interfere as benzyl substituted ammonium cations can be employed; (and also by aryl sulfonate anions).

Among the anions useful in the electrolytes employed in the present process, the aryl and alkaryl sulfonic acids are especially suitable, for example, salts of the following acids: benzenesulfonic acid, o-, m- or p-toluenesulfonic acid, o-, m- or p-ethylbenzenesulfonic acid, o-, m- or p-cumenesulfonic acid, o-, m- or p-tert-amylbenzenesulfonic acid, o-, m- or p-hexylbenzenesulfonic acid, o-xylene-4-sulfonic acid, p-xylene-2-sulfonic acid, m-xylene-4- or 5-sulfonic acid, mesitylene-2-sulfonic acid, durene-3-sulfonic acid, pentamethylbenzenesulfonic acid, o-dipropylbenzene-4-sulfonic acid, alpha- or beta-naphthalenesulfonic acid, o-, m- or p-biphenylsulfonic acid, and alpha-methyl-beta-naphthalenesulfonic acid. As explained heretofore, alkali metal salts are useful in the present invention with certain limitations, and the alkali metal salts of such sulfonic acids can be employed, i.e., the sodium, potassium, lithium, cesium or rubidium salts such as sodium benzenesulfonate, potassium p-toluenesulfonate, lithium o-biphenylsulfonate, rubidium beta - naphthalenesulfonate, cesium p - ethylbenzenesulfonate, sodium o-xylene - 3 - sulfonate, or potassium pentamethylbenzenesulfonate. The salts of such sulfonic acids may also be the saturated, aliphatic amine or heterocyclic amine salts, e.g., the mono-, di- or trialkylamine salts, or the mono-, di- or trialkanolamine salts, or the piperidine, pyrrolidine, or morpholine salts, e.g., the ethylamine, dimethylamine or triisopropylamine salts of benzenesulfonic acid or of o-, p- or m-toluenesulfonic acid; the isopropanolamine, dibutanolamine or triethanolamine salt of o-, p- or m-toluenesulfonic acid or of o-, p- or m-biphenylsulfonic acid; the piperidine salt of alpha- or beta-naphthalenesulfonic acid or of the cumenesulfonic acids; the pyrrolidine salt of o-, m- or p-amylbenzenesulfonate; the morpholine salt of benzenesulfonic acid, of o-, m- or p-toluenesulfonic acid, or of alpha- or beta-naphthalenesulfonic acid, etc. In general, the sulfonates of any of the ammonium cations disclosed generically or specifically herein can be employed in the present invention. The aliphatic sulfonates are prepared by reaction of the correspondingly substituted ammonium hydroxide with the sulfonic acid or with an acyl halide thereof. For example, by reaction of a sulfonic acid such as p-toluenesulfonic acid with a tetraalkylammonium hydroxide such as tetraethylammonium hydroxide there is obtained tetraethylammonium p-toluenesulfonate, use of which in the presently provided process has been found to give very good results. Other presently useful quaternary ammonium sulfonates are, e.g., tetraethylammonium o- or m-toluenesulfonate or benzenesulfonate; tetraethylammonium o-, m- or p-cumenesulfonate or o-, m- or p-ethylbenzenesulfonate, tetramethylammonium benzenesulfonate, or o-, m- or p-toluenesulfonate; N,N,-di-methylpiperidinium o-, m- or p-toluenesulfonate or o-, m- or p-biphenylsulfonate; tetrabutylammonium alpha- or beta-naphthalenesulfonate or o-, m- or p-toluenesulfonate; tetrapropylammonium o-, m- or p-amylbenzenesulfonate or alpha-ethyl-beta-naphthalene-sulfonate; tetraethanolammonium o-, m- or p-cumenesulfonate or o-, m- or p-toluenesulfonate; tetrabutanolammonium benzenesulfonate or p-xylene-3-sulfonate; tetrapentylammonium o-, m- or p-toluenesulfonate or o-, m- or p-hexylbenzenesulfonate, tetrapentanolammonium p-cymene-3-sulfonate or benzenesulfonate; methyltriethylammonium o-, m- or p-toluenesulfonate or mesitylene-2-sulfonate; trimethylethylammonium o-xylene-4-sulfonate or o-, m- or p-toluenesulfonate; triethylpentylammonium alpha- or beta-naphthalenesulfonate or o-, m- or p-butylbenzenesulfonate, trimethylethanolammonium benzenesulfonate or o-, m- or p-toluenesulfonate; N,N-di-ethylpiperidinium or N-methyl-pyrrolidinium o-, m- or p-hexylbenzenesulfonate or o-, m- or p-toluenesulfonate, N,N-di-isopropyl or N,N-di-butylmorpholinium o- m- or p-toluenesulfonate or o-, m- or p-biphenylsulfonate, etc.

The tetraalkylammonium salts of the aryl or alkarylsulfonic acids are generally preferred for use as the salt constituents of the electrolysis solution because the electrolyses in the tetraalkylammonium sulfonates are exclusively electro-chemical processes.

Among the ammonium and amine sulfonates useful as electrolytes in the present invention are the alkyl, aralkyl, and heterocyclic amine and ammonium sulfonates, in which ordinarily the individual substituents on the nitrogen atom contain no more than 10 atoms, and usually the amine or ammonium radical contains from 3 to 20 carbon atoms. It will be understood, of course, that di- and polyamines and di- and poly-ammonium radicals are operable and included by the terms amine and ammonium. The sulfonate radical can be from aryl, alkyl, alkaryl or aralkyl sulfonic acids of various molecular weights up to for example 20 carbon atoms, preferably about 6 to 20 carbon atoms, and can include one, two or more sulfonate groups. Any of the quaternary ammonium sulfonates disclosed and claimed in my copending application S.N. 75,123, filed December 12, 1960 can suitably be employed.

Another especially suitable class of salts for use in the present invention are the alkylsulfate salts such as methosulfate salts, particularly the amine and quarternary ammonium methosulfate salts. Methosulfate salts such as the methyltriethylammonium, tri-n-propylmethylammonium, triamylmethylammonium, tri-n-butylmethylammonium, etc., are very hygroscopic, and the tri-n-butylmethylammonium in particular forms very concentrated aqueous solutions which dissolve large amounts of organic materials. In general the amine and ammonium cations suitable for use in the alkylsulfate salts are the same as those for the sulfonates.

Various other cations are suitable for use in the present invention, e.g., tetraalkylphosphonium and trialkyl sulfonium cations, particularly as sulfonate salts formed from sulfonic acids as described above, or as methosulfate salts.

When the catholyte during electrolysis is acidic, it will generally be advisable to conduct the electrolysis under conditions which inhibit polymerization of the reactants involved or in the presence of a polymerization inhibitor, for example, in an atmosphere containing sufficient oxygen to inhibit the polymerization in question, or in the presence of inhibitors effective for inhibiting free radical polymerization. Classes of inhibitors for inhibiting free radical polymerzations are well known, e.g., such inhibitors as hydroquinone, p-t-butyl catechol, quinone, p-nitrosodimethylaniline, di-t-butyl hydroquinone, 2,5 - dihydroxy-1,4-benzoquinone, 1,4-naphthoquinone, chloranil, 9,10-phenanthraquinone, 4-amino-1-naphthol, etc., are suitable.

The hydroimerization of 2- and 4-alk-1-enyl pyridines and related compounds are described and claimed in simultaneous filed copending application S.N. 288,621, filed January 18, 1963.

What is claimed is:

1. The method of producing reduced coupled products of olefinc compounds selected from the group consisting of alpha, beta-olefinic ketones, carboxylates, carboxamides, nitriles, phosphonates, phosphinates, phosphine oxides and sulfones with a pyridyl ethylene having a pyridyl group bonded at positions selected from 2 and 4-positions which comprises subjecting an aqueous solution of said olefinic compounds and said pyridyl ethylene to electrolysis in contact with a cathode and separating the reduced, coupled product from the catholylte.

2. The method of claim 1 in which the pyridyl ethylene is 2-pyridylethene.

3. The method of claim 1 in which the pyridyl ethylene is 4-pyridylethene.

4. The method of claim 1 in which 2-vinylpyridine is reductively coupled with diethyl fumarate.

5. The method of claim 1 in which 2-vinylpyridine is reductively coupled with acrylonitrile.

6. The method of claim 1 in which methyl vinyl ketone is reductively coupled with 4-vinylpyridine.

7. The method of claim 1 in which the pyridyl ethylene is a 2-vinyl pyridine.

8. The method of reductive coupling which comprises subjecting an aqueous solution of an olefinic compound selected from the group consisting of alpha, beta-olefinic ketones, carboxylates, carboxamides, nitriles, phosphonates, phosphinates, phosphine oxides and sulfones together with an olefinic compound represented by the formula:

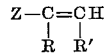

in which Z represents a pyridyl radical with its valence bond on an even-numbered carbon atom, and R and R' are selected from the group consisting of hydrogen and hydrocarbyl radicals containing no non-benzenoid unsaturation to electrolysis in contact with a cathode having a hydrogen overvoltage greater than that of copper, causing development of the cathode potential required for hydrodimerization, the solution containing at least about 10% by weight of olefinic compound and having a pH above about 6, and recovering the resulting reductively coupled compound.

9. The method of claim 1 in which a polymerization inhibitor is present.

10. The method of claim 8 in which an aqueous electrolysis solution is employed and a quaternary ammonium salt constitutes at least 30% by weight of the water and salt, the said salt being soluble in such amounts.

References Cited by the Examiner
UNITED STATES PATENTS

| | | | |
|---|---|---|---|
| 2,632,729 | 3/1953 | Woodman | 204—72 |
| 2,632,761 | 3/1953 | Cheney | 260—290 |
| 2,726,204 | 12/1955 | Park et al. | 204—72 |
| 2,898,338 | 8/1959 | Villani | 260—290 |

JOHN H. MACK, *Primary Examiner.*